United States Patent
Tjernström et al.

(10) Patent No.: US 11,940,249 B2
(45) Date of Patent: Mar. 26, 2024

(54) METHOD, COMPUTER PROGRAM AND WEAPONS SYSTEM FOR CALCULATING A BURSTING POINT OF A PROJECTILE

(71) Applicant: BAE SYSTEMS BOFORS AB, Karlskoga (SE)

(72) Inventors: Peter Tjernström, Karlskoga (SE); Frans Eriksson, Hammarö (SE)

(73) Assignee: BAE SYSTEMS BOFORS AB, Karlskoga (SE)

(*) Notice: Subject to any disclaimer, the term of this patent is extended or adjusted under 35 U.S.C. 154(b) by 101 days.

(21) Appl. No.: 17/764,567

(22) PCT Filed: Sep. 2, 2020

(86) PCT No.: PCT/SE2020/050831
§ 371 (c)(1),
(2) Date: Mar. 29, 2022

(87) PCT Pub. No.: WO2021/066698
PCT Pub. Date: Apr. 8, 2021

(65) Prior Publication Data
US 2022/0357129 A1    Nov. 10, 2022

(30) Foreign Application Priority Data
Sep. 30, 2019 (SE) .................. 1900155-1

(51) Int. Cl.
*F41G 7/30* (2006.01)
*F42C 11/06* (2006.01)

(52) U.S. Cl.
CPC ........... *F41G 7/303* (2013.01); *F42C 11/065* (2013.01)

(58) Field of Classification Search
CPC .......... F41G 7/303; F41G 7/006; F41G 7/308
(Continued)

(56) References Cited

U.S. PATENT DOCUMENTS 8,464,949 B2 *  6/2013  Namey ............... F41G 3/14
                                              235/404
8,710,411 B1 *  4/2014  LaPat ............... F41G 7/226
                                              244/3.1
(Continued)

FOREIGN PATENT DOCUMENTS

| EP | 0887613 B1 | 8/2003 |
| GB | 2279444 A | 1/1995 |
| SE | 538155 C2 | 11/2014 |

OTHER PUBLICATIONS

International Search Report (dated Oct. 27, 2020) for corresponding International App. PCT/2020/050831.

*Primary Examiner* — Ahshik Kim
(74) *Attorney, Agent, or Firm* — WRB-IP PLLC

(57) ABSTRACT

A method is provided for calculating the bursting point of at least one projectile fired at a target object, involving measuring the position of the projectile, estimating the position of the projectile, estimating the speed of the projectile, measuring the position of the target object, estimating the position of the target object, estimating the speed of the target object, calculating optimal bursting points for the projectile based on the estimated position of the projectile, the estimated speed of the projectile, the estimated position of the target object and the estimated speed of the target object, and communicating the bursting points for the projectile to the projectile. A computer program, a computer system, and a weapons system are also provided.

9 Claims, 3 Drawing Sheets

(58) Field of Classification Search
USPC .......................................................... 235/411
See application file for complete search history.

(56) References Cited

U.S. PATENT DOCUMENTS

| | | | |
|---|---|---|---|
| 8,757,486 B2* | 6/2014 | Cook | F41G 7/007 |
| | | | 235/400 |
| 9,250,043 B1* | 2/2016 | Block | G01S 7/003 |
| 2003/0210170 A1 | 11/2003 | Krikorian et al. | |
| 2004/0021033 A1* | 2/2004 | Redano | F41H 11/02 |
| | | | 244/3.1 |
| 2010/0117888 A1 | 5/2010 | Simon | |
| 2017/0300047 A1 | 10/2017 | Kolanek et al. | |

* cited by examiner

METHOD, COMPUTER PROGRAM AND WEAPONS SYSTEM FOR CALCULATING A BURSTING POINT OF A PROJECTILE

BACKGROUND AND SUMMARY

The present patent application concerns a method for using gun barrel weapons with controlled or uncontrolled ammunition for fighting against targets.

When fighting against targets such as missiles, airplanes or helicopters with gun barrel weapons, one traditionally employs projectiles designed with zone tubes or timing tubes. Projectiles designed with timing tubes burst/detonate at a certain time, which is determined from parameters such as the muzzle velocity, the target range, etc. The alternative is a projectile designed with zone tubes, which cause the projectile to burst/detonate in proximity to the target, where a sensor in the projectile detects the target object.

An example of a method and device for calculating the bursting point is given in patent U.S. Pat. No. 5,814,756, which shows a technical solution for how to calculate a bursting point based on target measurement and measurement of the speed of the projectile when it leaves the gun barrel. The invention presented in U.S. Pat. No. 5,814,756 differs from the invention described in the present patent application in that the information is programmed into a projectile in connection with its launching from a gun barrel weapon and the speed of the projectile is only measured when the projectile leaves the gun barrel.

An alternative example of a method and device for calculating the bursting point is given in patent EP 0 887 613 B1, which shows a technical solution for how to calculate a bursting point based on the speed of the projectile in its trajectory towards the target object and how a newly calculated bursting point can be programmed in the projectile with wireless communication. The invention presented in EP 0 887 613 B1 differs from the invention described in the present patent application in that the target object is in a fixed position.

Further problems which the present invention solves will appear in connection with the following detailed description of the various embodiments.

It is desirable to improve the possibility of calculating correct bursting points for projectiles when air defense gun barrels are used to defend a protected object against incoming guided airborne weapons, also called aerial targets or target objects. This can be achieved by calculating the trajectories of the launched projectiles. The calculations are based on measured and/or estimated knowledge of the current position and speed of the target object and the projectiles.

The invention involves, according to an aspect thereof, a method for calculating the bursting point of at least one projectile fired at a target object, involving the following method steps: measuring the position of the projectile, estimating the position of the projectile, estimating the speed of the projectile, measuring the position of the target object, estimating the position of the target object, estimating the speed of the target object, calculating optimal bursting points for the projectile based on the estimated position of the projectile, the estimated speed of the projectile, the estimated position of the target object and the estimated speed of the target object, and communicating the bursting points for the projectile to the projectile.

According to further aspects of the method for calculating the bursting point of at least one projectile fired at a target object:

the target object is an aerial target object;
the trajectory of the target object and the projectile is estimated for calculating the estimated position of the projectile, the estimated speed of the projectile, the estimated position of the target object and the estimated speed of the target object;
the projectile is controllable;
the control information for the projectile is communicated to the projectile based on the estimated position of the projectile, the estimated speed of the projectile, the estimated position of the target object and the estimated speed of the target object, where the control information comprises the control commands for guiding the projectile towards the target object.

Moreover, the invention comprises, according to an aspect thereof, a computer program comprising program code which, when the program code is executed on a computer, constitutes the method according to the above.

Moreover, the invention comprises, according to an aspect thereof, a computer system comprising a computer, where said computer executes the computer program according to the above.

Moreover, the invention comprises, according to an aspect thereof, a weapons system comprising gun barrel weapons, a fire control, and sensor systems for measuring a target object and projectiles, comprising a computer system according to the above.

According to further aspects for a weapons system:
the sensor system comprises at least one radar.

The benefit of an aspect of the present invention is that the effect of all launched projectiles can be used against a target object. The projectiles, being preferably uncontrolled, which are launched during the firing will be detonated/burst at the most optimal possible position to achieve the effect at the target object, regardless of the distance from the target object.

BRIEF DESCRIPTION OF THE DRAWINGS

The invention shall be described more closely in the following with reference to the appended figures, where.

DETAILED DESCRIPTION

When fighting against a movable target object, such as an aerial target, with uncontrolled projectiles fired from gun barrel weapons, the projectiles are launched towards the points where the target object will be located when the projectiles reach it. Such points, usually called points of aim, are predicted based on measurement data and estimates. Likewise, the trajectory of projectiles fired towards the target object can be predicted or estimated. The estimation or prediction is based on knowledge as to the previous positions of the projectile and a hypothesis as to how the projectile will behave in future.

At least one sensor is used to track and measure the position of the projectile. The sensor measures the position of the projectile repeatedly, frequently or continuously, forming the measurement data. Based on the measurement data from this sensor, the current position and speed of the projectile are estimated. A predictor then calculates, guided by the estimate and hypothesis for the target object and the trajectory of the projectiles, optimal bursting points for the projectiles in order to fight against the target object. A communication unit, such as a radio, communicates information about the bursting point to the projectile. The information about the bursting point may be, for example, a certain time from the present time, a certain time based on a given clock, or a position indication, or a combination of the above.

A system designed to fight against a target object with the aid of gun barrel weapons and uncontrolled projectiles may consist of or comprise three parts: a fire control, a weapon, and projectiles. Such a system may also be called an air defense gun barrel. By uncontrolled projectiles is meant various forms of projectiles, such as shells, missiles and/or rockets designed for use in fighting against the target object. A fire control incorporated in an air defense gun barrel includes one or more sensors and a plurality of methods for processing and evaluating sensor data. The sensor or sensors incorporated in and used by the fire control may also be called the sight. Processed information from the sight is used to control the direction of both the sight and the weapon.

Figure 1:
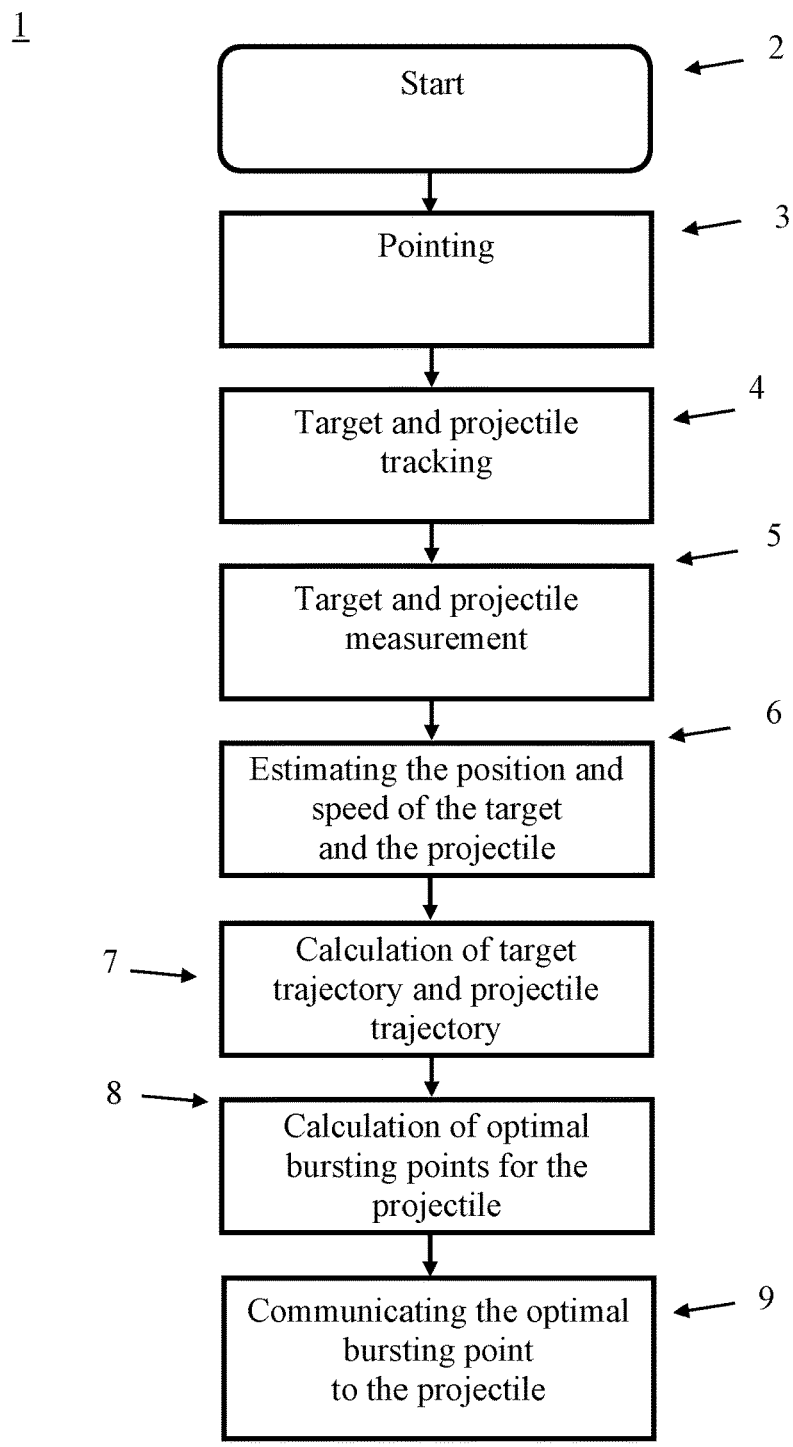
FIG. 1 shows a flow chart of the method for directing fire against target objects according to one embodiment of the invention.

FIG. 1 shows a flow chart for a method in a fire control system 1. When a combating is initiated, start 2 in FIG. 1, the sight is directed at the target object being combated. This is usually made possible by an external unit, such as a reconnaissance radar, providing information about the position of the target object as a function of the time. The sensor, as the reconnaissance radar, measures the position or attitude of the target object repeatedly, frequently or continuously, forming measurement data. This external unit is called the pointing unit. The procedure is called pointing 3.

In parallel with the sight being directed at the target object, the gun barrel may be directed at a preliminary calculated point of aim whose position is based on data from the pointing unit.

Target acquisition constitutes the start of a new sequence, known as target and projectile tracking 4. The sight then controls its own line of sight so that the line of sight tracks the target object. In parallel with the target tracking, previous launched projectiles are measured with the sight or another sensor for target measurement.

When the target and projectile tracking 4 has been established, the target and projectile measurement 5 is started. The sight now attempts to measure both the direction and the distance of the target object and the projectiles.

When the sight measures the position of the target object and the projectiles during the target and projectile measurement 5, this is usually done with high frequency and with better accuracy than the pointing sensor can provide. This is the fundamental reason for using two kinds of sensors, reconnaissance sensors and fire control sensors. However, as sensor development continues, it may be that a single sensor is used for all the tasks.

The measurement data is used to calculate the estimated position of the projectile, the estimated speed of the projectile, the estimated position of the target object and the estimated speed of the target object, which is done in step 6, estimating of the position and speed of the target and the projectile.

Based on the estimated position of the projectile, the estimated speed of the projectile, the estimated position of the target object and the estimated speed of the target object, an optimal bursting point can be predicted in the step of calculation of optimal bursting points for the projectile 8.

An alternative for calculating the optimal bursting point is based on the speed of the target object, the speed of the projectile, the boom distance (the perpendicular distance relative to the direction of travel of the projectile towards the target object upon passage) and the configuration of the warhead, i.e., the angles at which fragments are thrown out from the projectile. The optimal bursting point for a projectile is calculated by trigonometry so that the largest possible number of the most effective fragments from the projectile will hit the target object.

In the case when the measurement of target object and projectile is controlled in various ways, different forms of prediction can be used, as described below, in order to calculate the estimated position of the projectile, the estimated speed of the projectile, the estimated position of the target object and the estimated speed of the target object, which in turn can be used to calculate the optimal bursting point for the projectile. This is done in step 7, calculation of target trajectory and projectile trajectory. In the case when continuous metered data is available, step 7 becomes redundant.

For the calculation/prediction of trajectory for the target object and trajectory for the projectile, more simple models can sometimes be used, assuming travel on a measured trajectory without acceleration, but also more complex methods where the acceleration of the target object is measured and estimated based on the possible target, or protected object which the target object is supposed to strike or travel toward.

When the optimal bursting point has been calculated, this is communicated to the projectile or projectiles, as shown in the step 9 of communicating the optimal bursting point to the projectile. In the case when improved bursting points are calculated, these can be communicated once more to the projectile or projectiles, provided they have not already burst or detonated. The communication to the projectile may occur for example with communication equipment designed for this purpose, but it may also occur with the sensor which measures the projectile, for example, with a radar. Various forms of radio communication or optical communication are other possible communication methods. In one embodiment, each projectile has its own unique address and a unique bursting point is communicated to each projectile, preferably the estimated bursting point is communicated early in the trajectory when the electromagnetic environment is assumed to be less disturbed, in order to update it further in the trajectory, if possible. One conceivable scenario is that the disturbance environment worsens in the trajectory of the projectile, so that later messages to the projectile may be prevented, since the radio link is jammed. In this case, in one embodiment, the projectile continues with the detonation point received most recently.

Moreover, controllable projectiles may be used. Control information to the projectile is communicated to the projectile based on the estimated position of the projectile, the estimated speed of the projectile, the estimated position of the target and the estimated speed of the target, where the control information comprises control information for guiding the projectile towards the target object. Thanks to guidance of the projectile, the position of the projectile can be moved to a more favorable position closer to the target object.

Figure 2:
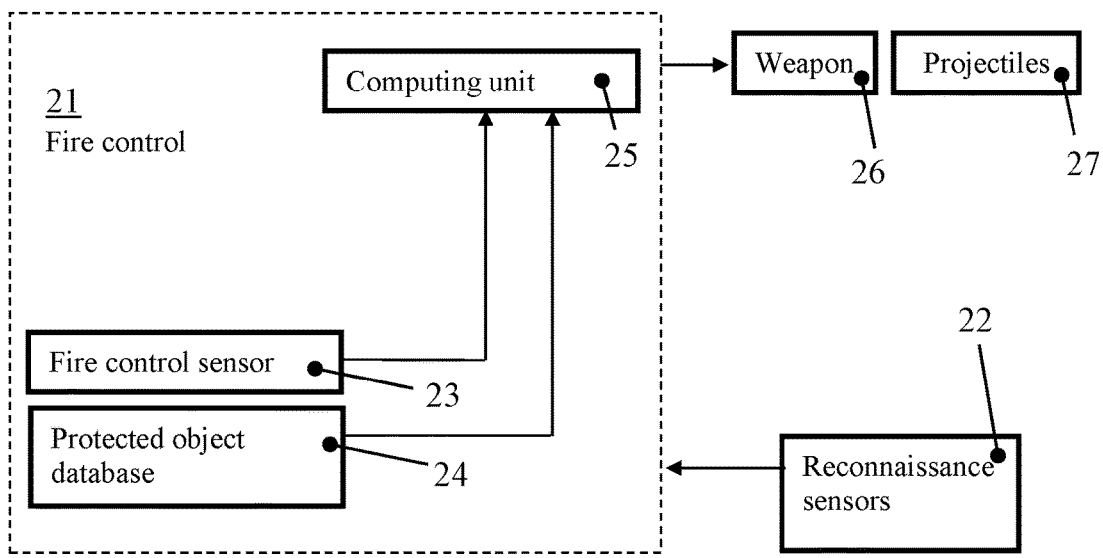
FIG. 2 shows a block diagram of a device for fighting against target objects according to one embodiment of the invention.

An air defense gun barrel system 20, as shown in FIG. 2, comprises a fire control 21, one or more weapons 26 and projectiles 27 which can be launched towards the target object. The system 20 gets pointing information from certain external reconnaissance sensors 22, which can search very large volumes with great depth at the expense of accuracy and measurement frequency. The air defense gun barrel system 20 comprises a fire control sensor 23 which, after the pointing process, can measure the position of the individual target object in a small sector with limited depth but with high accuracy and high measurement frequency. The computing unit 25 is used to calculate the points of aim at which the weapon 26 should be directed and to calculate optimal bursting points, and in a particular instance to estimate the trajectory for the target object and the projectile. The fire control 21 may also comprise a protected object database 24 which contains positions of a multitude of protected objects which may be found in the neighborhood around the air defense gun barrel system 20. Moreover, there is also equipment for communicating with the projectile, not shown in the figure. The computing unit 25 communicates optimal bursting points to the communication equipment.

Figure 3:
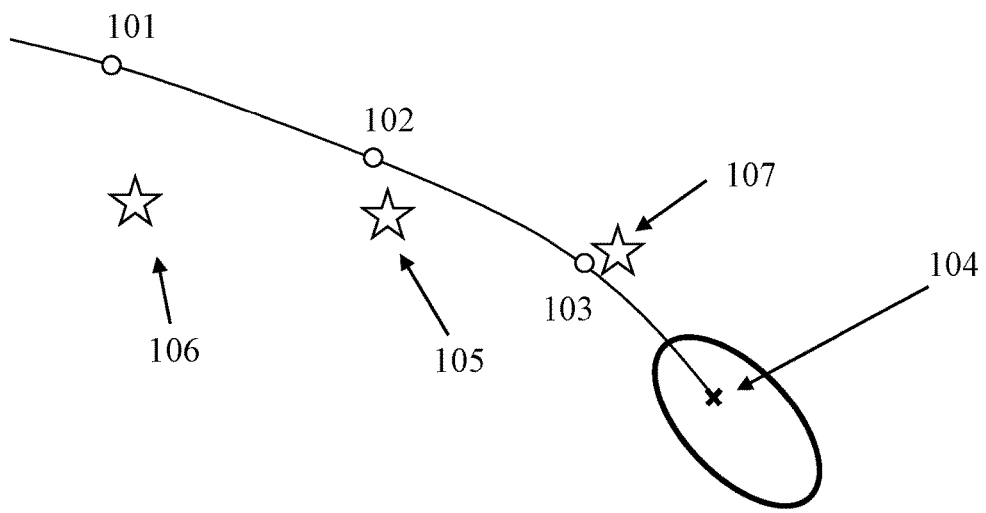
FIG. 3 shows the movement for a target object according to one embodiment of the invention.

FIG. 3 shows a measurement sector 100 for a target object on the way towards a protected object 104. Along the course of the target object towards the protected object 104, the target object will pass by a number of positions or points on its path towards the protected object. At the point 101, which is located far away from the protected object, the target object can be combated with an early launched projectile 106. Since the projectile 106 is located at a relatively far distance from the target object, a conventional zone tube cannot be used, but instead a bursting point is calculated when the projectile is detonated and thereby disperses fragments or another method of action against the target object, such that the fragments strike the target object on the trajectory of the target object towards the protected object is used. The target object may alternatively continue towards the protected object. In the event that the target object continues on its way towards the protected object, after a certain time the target object will be located at point 102. At this point, the target object is combated with a projectile 105 located closer to the target object. In the same way, the target object may be combated at this later point in the trajectory on the way towards the protected object. In the event that the target object is also not combated at this position, the target object continues on to point 103. In this case, a projectile 107 is launched toward the target object at a close range from the target object. In this position, the target object has a bursting point calculated with higher reliability. The projectile can also be designed with a zone tube which can detect the target object.

Figure 4:
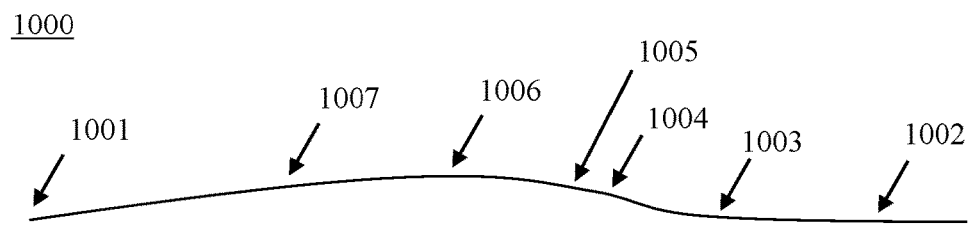
FIG. 4 shows the trajectory of a target object according to one embodiment of the invention.

FIG. 4 shows a trajectory 1000 of a target object towards a protected object 1001. The target object flies towards the protected object 1001. The target object is discovered by a reconnaissance sensor when it passes the point 1002. The reconnaissance sensor then points a fire control sensor. Somewhere between point 1002 and 1003, the fire control sensor finds the target object and begins to track it and measure the position and speed of the target object. At point 1003 the target object possibly commences a course change, e.g., in order to detect the protected object 1001. At point 1004, the course change of the target object is accomplished. At point 1005, the target object begins to follow a guidance law which strives to guide the vehicle to strike the protected object 1001. When the target object passes the point 1006, the fire control can begin to predict the point of aim 1007. The prediction is based on data from the fire control sensor and possibly a hypothesis on which guidance law the target object is using. Combating of the target object may begin early and the projectiles on the way towards the target object may be programmed to explode, with optimal bursting point, to enable a combating of the target object with the highest possible probability.

The invention is not limited to the specially presented embodiments, but rather it may vary in different ways within the scope of the claims.

For example, the number of sensors, launching devices, or systems may [differ] from the elements making up the method for fire control against a target object and the details may be adapted according to the weapons systems, platforms, and other design features in the given instance.

The above described method for fire control against a target object may be used in theory for all guided vehicles and systems comprising airplanes, unmanned flying vehicles, and missiles.

Moreover, the invention is not limited to a particular form of target object, but can also be used for other target types such as surface targets or aerial targets.

Moreover, all forms of projectiles are encompassed, including shells, explosive shells, robots, missiles and rockets.

Moreover, the invention is not limited to a particular number of projectiles or target objects, but can be adapted to the number of target objects or projectiles in a given instance.

The invention claimed is:

1. A method for calculating a bursting point of at least one projectile fired from an air defense gun barrel at a target object, comprising:
   measuring a position of the projectile,
   estimating a position of the projectile,
   estimating a speed of the projectile,
   measuring a position of the target object,
   estimating a position of the target object,
   estimating a speed of the target object,
   estimating a trajectory of the target object,
   calculating optimal bursting points for the projectile based on the estimated position of the projectile, the estimated speed of the projectile, the estimated position of the target object and the estimated speed of the target object,
   communicating the bursting points for the projectile to the projectile.

2. The method for calculating the bursting point of at least one projectile fired at a target object according to claim 1, wherein the target object is an aerial target object.

3. The method for calculating the bursting point of at least one projectile fired at a target object according to claim 2, wherein the trajectory of the projectile is estimated for calculating the estimated position of the projectile and the estimated speed of the projectile.

4. The method for calculating the bursting point of at least one projectile fired at a target object according to claim 1, wherein the projectile is controllable.

5. The method for calculating the bursting point of at least one projectile fired at a target object according to claim 4, wherein control information for the projectile is communicated to the projectile based on the estimated position of the projectile, the estimated speed of the projectile, the estimated position of the target object and the estimated speed of the target object, where the control information comprises control commands for guiding the projectile towards the target object.

6. A non-transitory computer storage medium comprising program code wherein, when the program code is executed on a computer, the computer executes a method for calculating a bursting point of at least one projectile fired from an air defense gun barrel at a target object, the method comprising:
- measuring a position of the projectile,
- estimating a position of the projectile,
- estimating a speed of the projectile,
- measuring a position of the target object,
- estimating a position of the target object,
- estimating a speed of the target object,
- estimating a trajectory of the target object,
- calculating optimal bursting points for the projectile based on the estimated position of the projectile, the estimated speed of the projectile, the estimated position of the target object and the estimated speed of the target object,
- communicating the bursting points for the projectile to the projectile.

7. A computer system comprising a computer, wherein the computer is configured to execute a computer program so that the computer a method for calculating a bursting point of at least one projectile fired from an air defense gun barrel at a target object, the method comprising:
- measuring a position of the projectile,
- estimating a position of the projectile,
- estimating a speed of the projectile,
- measuring a position of the target object,
- estimating a position of the target object,
- estimating a speed of the target object,
- estimating a trajectory of the target object,
- calculating optimal bursting points for the projectile based on the estimated position of the projectile, the estimated speed of the projectile, the estimated position of the target object and the estimated speed of the target object,
- communicating the bursting points for the projectile to the projectile.

8. A weapons system comprising gun barrel weapons, a fire control, and sensor systems for measuring a target object and projectiles, the fire control comprises a computer system comprising a computer, wherein the computer is configured to execute a computer program so that the computer executes a method for calculating a bursting point of at least one projectile fired from an air defense gun barrel at a target object, the method comprising:
- measuring a position of the projectile,
- estimating a position of the projectile,
- estimating a speed of the projectile,
- measuring a position of the target object,
- estimating a position of the target object,
- estimating a speed of the target object,
- estimating a trajectory of the target object,
- calculating optimal bursting points for the projectile based on the estimated position of the projectile, the estimated speed of the projectile, the estimated position of the target object and the estimated speed of the target object,
- communicating the bursting points for the projectile to the projectile.

9. The weapons system according to claim 8, wherein the sensor system comprises at least one radar.

\* \* \* \* \*